US012584842B2

(12) United States Patent
Hsieh et al.

(10) Patent No.: US 12,584,842 B2
(45) Date of Patent: Mar. 24, 2026

(54) SMOKE ALARM HAVING LAYERED STRUCTURE

(71) Applicant: EVERDAY TECHNOLOGY CO., LTD., Yilan County (TW)

(72) Inventors: Shih-Hsiung Hsieh, Yilan County (TW); Yi-Shan Wu, Yilan County (TW)

(73) Assignee: EVERDAY TECHNOLOGY CO., LTD., Yilan County (TW)

( * ) Notice: Subject to any disclaimer, the term of this patent is extended or adjusted under 35 U.S.C. 154(b) by 145 days.

(21) Appl. No.: 18/536,245

(22) Filed: Dec. 12, 2023

(65) Prior Publication Data

US 2025/0012698 A1     Jan. 9, 2025

(30) Foreign Application Priority Data

Jul. 3, 2023     (TW) .................................. 112206840

(51) Int. Cl.
G01N 15/075          (2024.01)

(52) U.S. Cl.
CPC .................................. G01N 15/075 (2024.01)

(58) Field of Classification Search
CPC .................................................... G01N 15/075
See application file for complete search history.

(56) References Cited

U.S. PATENT DOCUMENTS

| | | | | |
|---|---|---|---|---|
| 3,681,603 | A | * | 8/1972 | Scheidweiler ....... G08B 17/113 340/630 |
| 3,916,209 | A | * | 10/1975 | Steele .................. G08B 17/107 340/630 |
| 5,751,218 | A | * | 5/1998 | Winterble ............ G08B 17/107 340/630 |
| 2002/0084907 | A1 | * | 7/2002 | Rattman .............. G08B 17/113 340/630 |
| 2024/0312325 | A1 | * | 9/2024 | Zamparelli ............ G08B 17/10 |

* cited by examiner

*Primary Examiner* — Michelle M Iacoletti
*Assistant Examiner* — Jarreas Underwood
(74) *Attorney, Agent, or Firm* — Li & Cai Intellectual Property Office

(57)          ABSTRACT

A smoke alarm having a layered structure includes a case, a smoke detecting unit, and a layering plate. The smoke detecting unit is disposed in the case, and includes a smoke collecting box and a control module electrically connected to the smoke collecting box. The layering plate is disposed in the case. The layering plate defines an upper layer space and a lower layer space in the case, the upper layer space is a smoke guiding space, and the smoke collecting box is accommodated in the upper layer space to facilitate smoke-containing air to flow to the smoke collecting box. The lower layer space is a module mounting space, and the control module is accommodated in the lower layer space to facilitate mounting of a sub-module of the control module that is detachable.

9 Claims, 6 Drawing Sheets

SMOKE ALARM HAVING LAYERED STRUCTURE

CROSS-REFERENCE TO RELATED PATENT APPLICATION

This application claims the benefit of priority to Taiwan Patent Application No. 112206840, filed on Jul. 3, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a smoke alarm, and more particularly to a smoke alarm having a layered structure.

BACKGROUND OF THE DISCLOSURE

Fire alarm devices are generally installed indoors for prevention of fire hazards. Most conventional fire alarm devices have a space for the inflow of smoke-containing air, but the conventional fire alarm devices do not have a dedicated guiding layer of smooth space for guiding the smoke into a smoke chamber, so as to not be conducive to the inflow of smoke. Furthermore, with the addition of sub-modules such as a radio frequency module in the fire alarm devices, an interference flow tends to be formed which interferes with the airflow of the smoke entering the smoke chamber, such as to affect detection characteristics of the fire alarm devices.

SUMMARY OF THE DISCLOSURE

In response to the above-referenced technical inadequacies, the present disclosure provides a smoke alarm having a layered structure to effectively improve on the problems associated with the conventional smoke alarm.

In order to solve the above-mentioned problems, one of the technical aspects adopted by the present disclosure is to provide a smoke alarm having a layered structure. The smoke alarm includes a case, a smoke detecting unit, and a layering plate. The smoke detecting unit is disposed in the case, and includes a smoke collecting box and a control module electrically connected to the smoke collecting box. The layering plate is disposed in the case. The layering plate defines an upper layer space and a lower layer space in the case, the upper layer space is a smoke guiding space, and the smoke collecting box is accommodated in the upper layer space to facilitate smoke-containing air to flow to the smoke collecting box. The lower layer space is a module mounting space, and the control module is accommodated in the lower layer space to facilitate mounting of a sub-module of the control module that is detachable.

Therefore, in the smoke alarm having a layered structure provided by the present disclosure, the layering plate defines an upper layer space and a lower layer space in the case, the upper layer space is a smoke guiding space, and the smoke collecting box is accommodated in the upper layer space to facilitate smoke-containing air to flow to the smoke collecting box; furthermore, the lower layer space is a module mounting space, and the control module is accommodated in the lower layer space to facilitate mounting of a sub-module of the control module that is detachable. Therefore, a structural design of the control module being accommodated in the lower layer space that is specifically divided facilitates the mounting of different sub-modules, and a structural design of the smoke collecting box being accommodated in the upper layer space that is specifically divided prevents the guiding of the smoke-containing air from being affected by different sub-modules.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
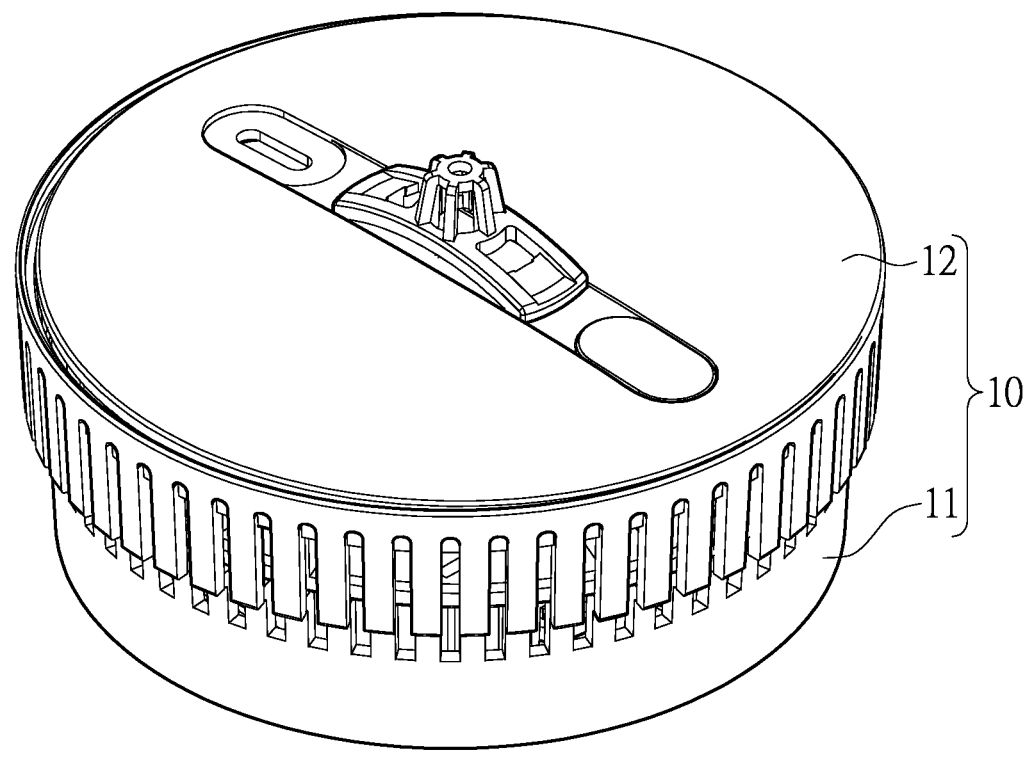
FIG. 1 is a schematic perspective view of a smoke alarm having a layered structure according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure provides a smoke alarm having a layered structure; that is, the smoke alarm has a specific space for guiding smoke to flow inside. In other words, any smoke alarm not having a specific space for guiding smoke to flow in is different from the smoke alarm of the present disclosure.

Figure 2:
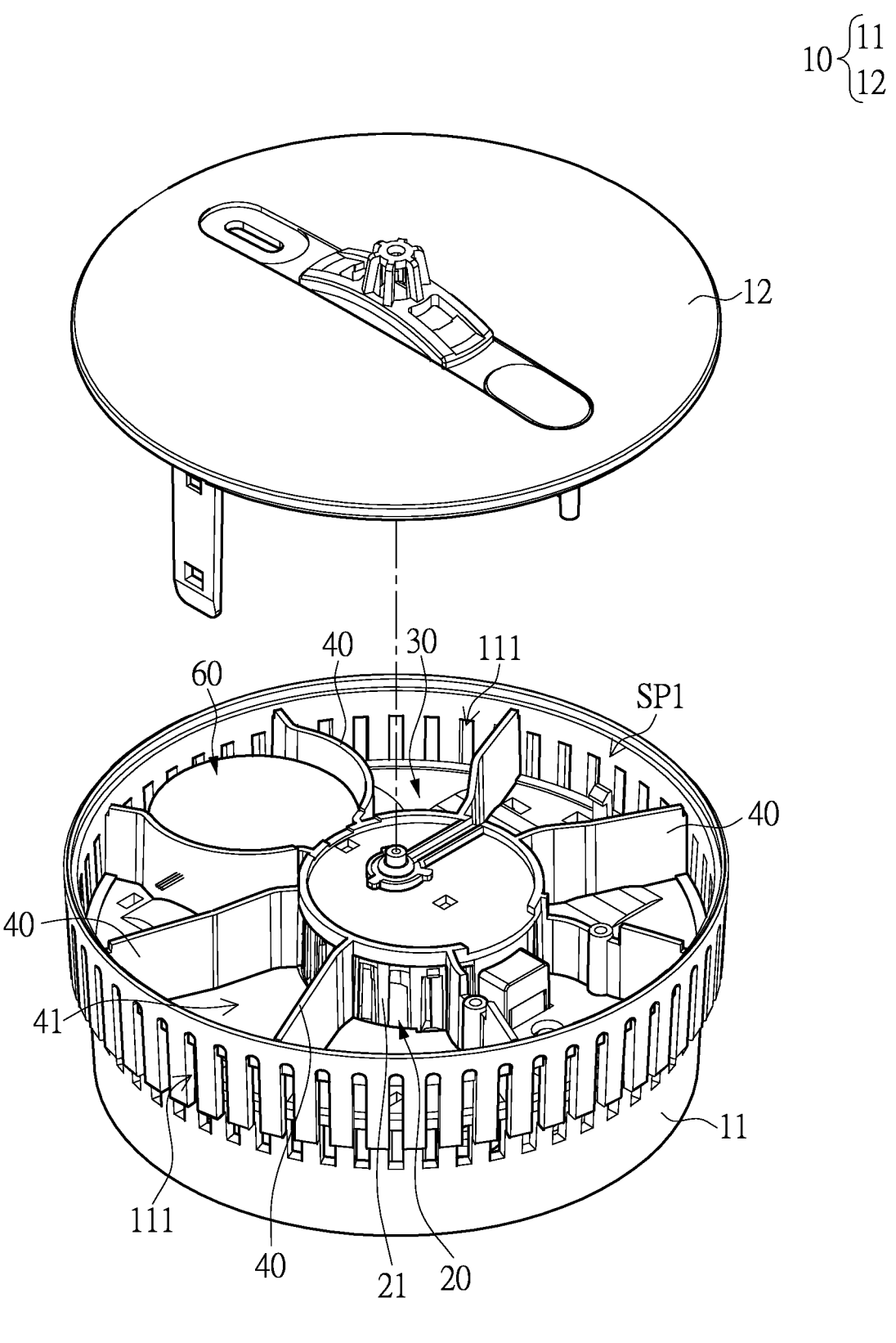
FIG. 2 is a schematic partially exploded view of the smoke alarm having the layered structure according to the present disclosure.
Figure 3:
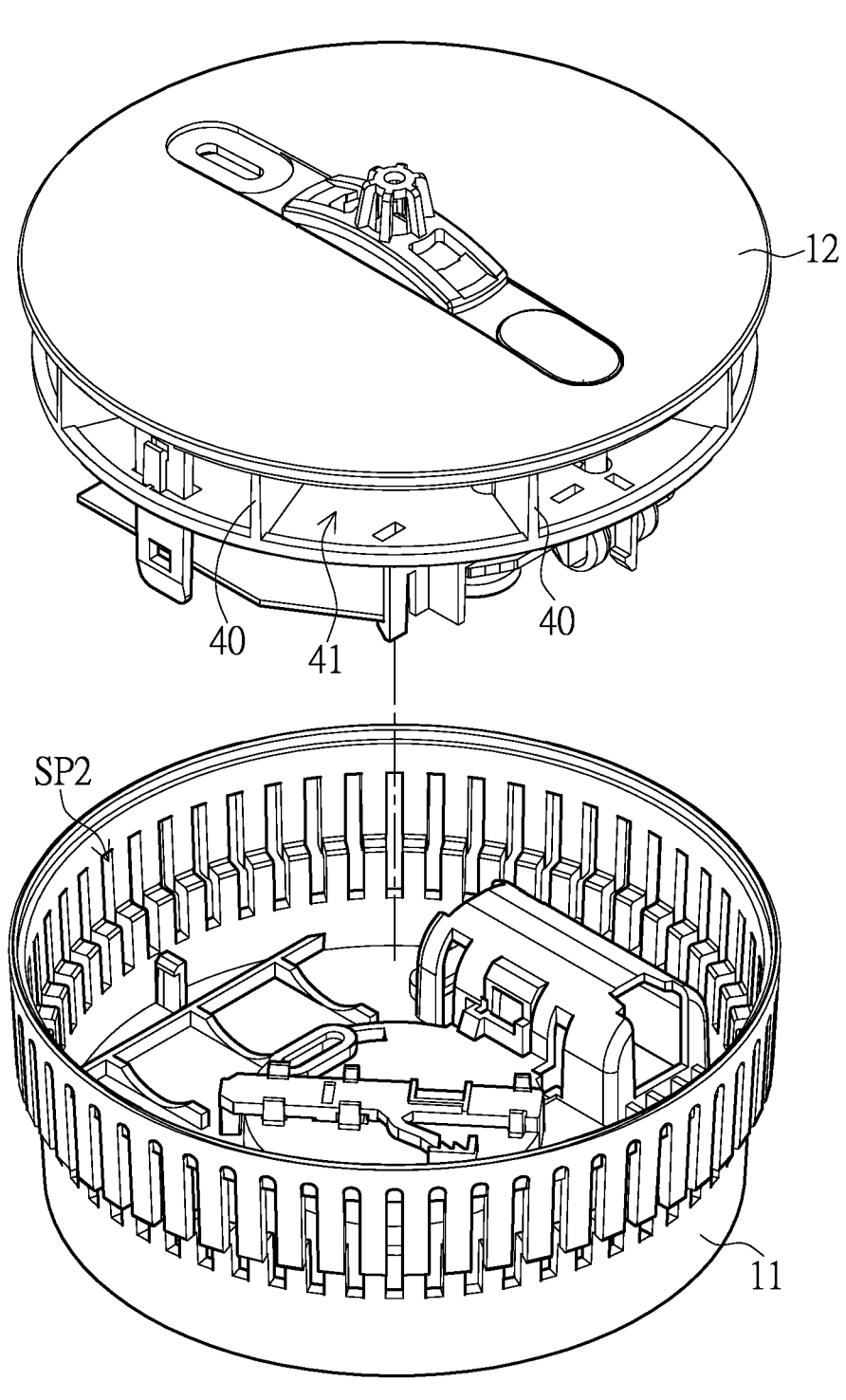
FIG. 3 is another schematic partially exploded view of the smoke alarm having the layered structure according to the present disclosure.
Figure 4:
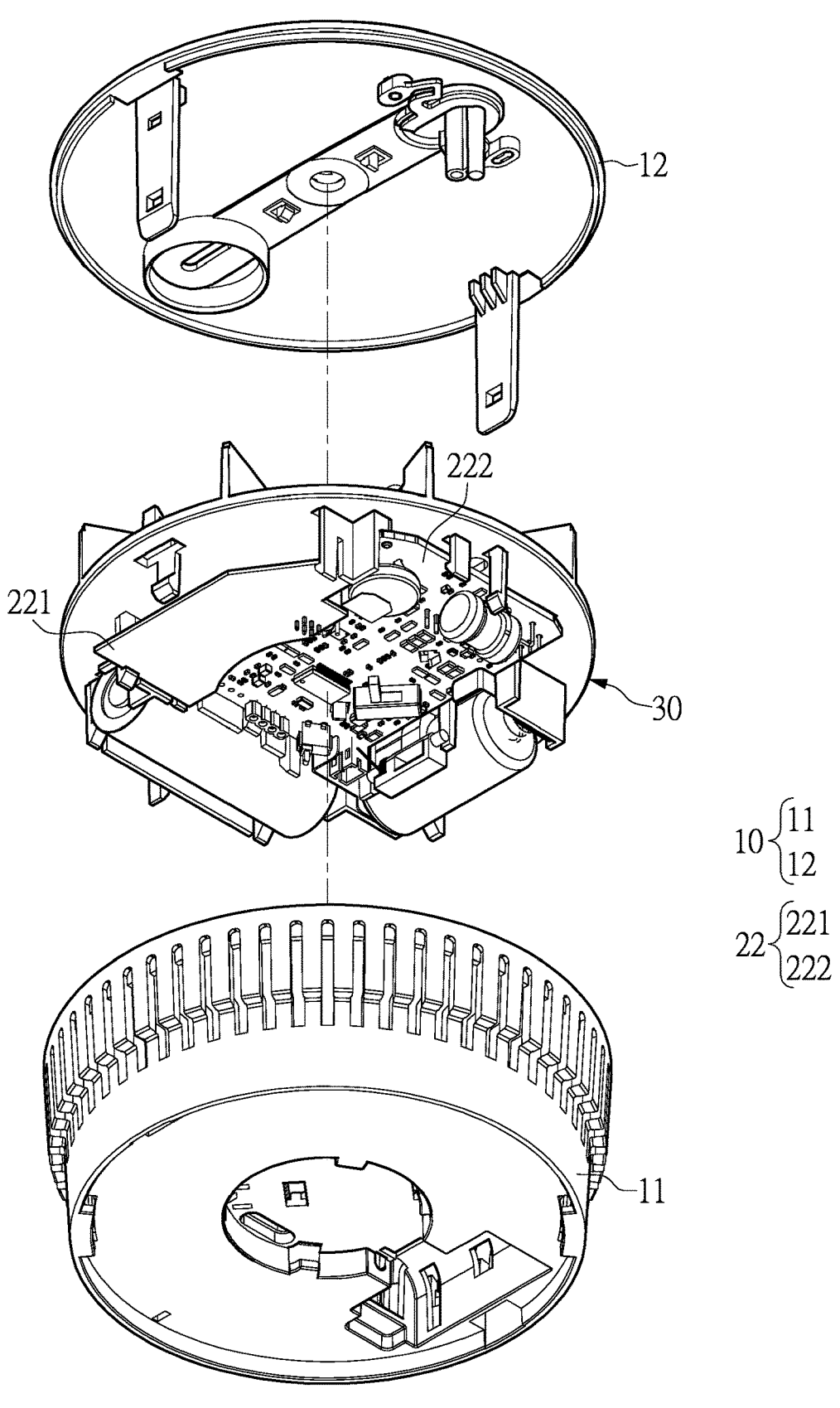
FIG. 4 is yet another schematic partially exploded view of the smoke alarm having the layered structure according to the present disclosure.
Figure 5:
FIG. 5 is a schematic side view of the smoke alarm having the layered structure according to the present disclosure.
Figure 6:
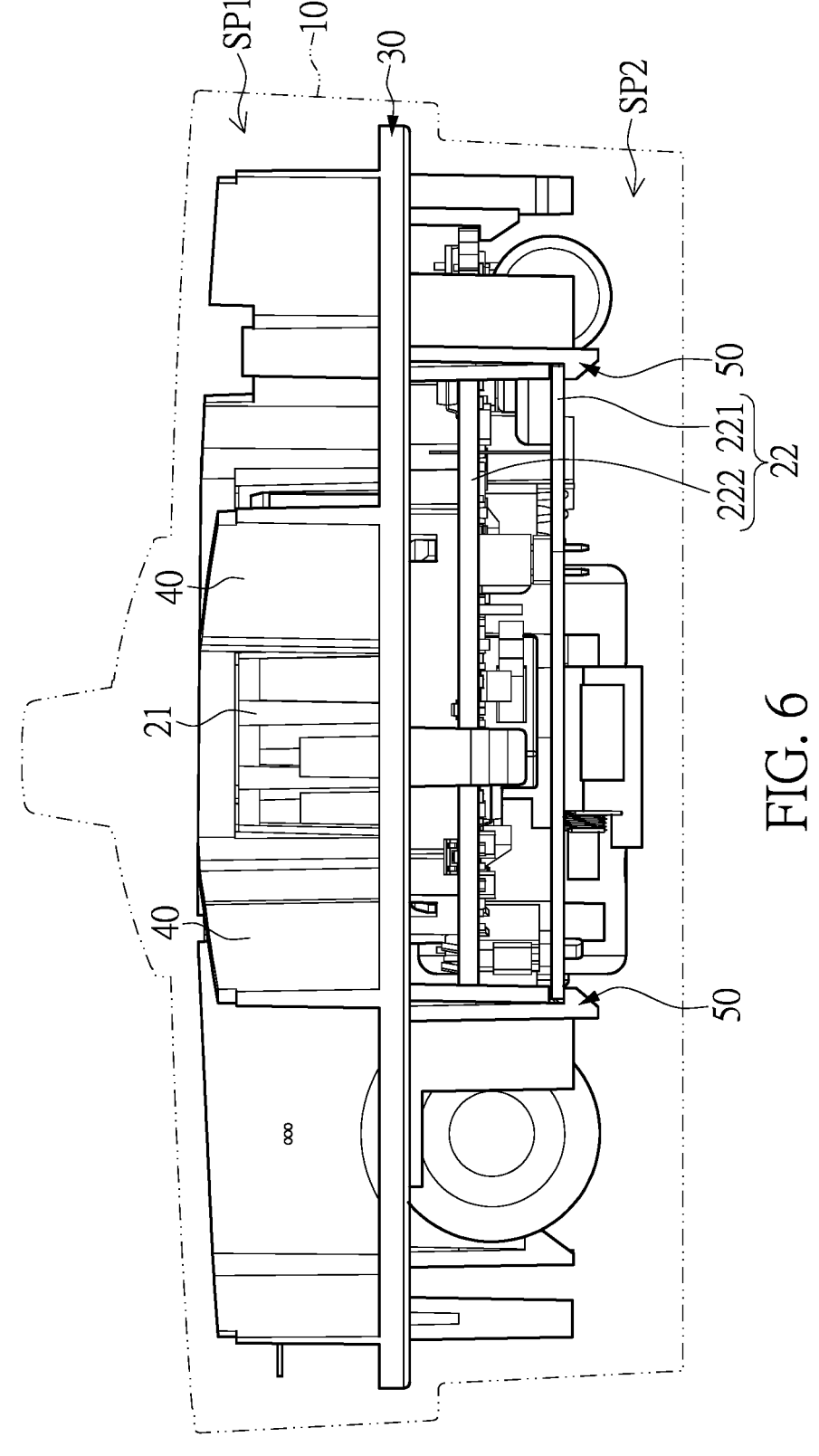
FIG. 6 is a schematic view of the smoke alarm having the layered structure according to the present disclosure.

Reference is made to FIG. 1 to FIG. 6, which illustrate the smoke alarm having the layered structure provided by the present disclosure. The smoke alarm having the layered structure provided by the present disclosure includes a case 10, a smoke detecting unit 20, and a layering plate 30.

The case 10 can include a first case body 11 and a second case body 12 that are assembled to each other. The first case body 11 can be a bottom case, and the second case body 12 can be a top case. The first case body 11 can be a case having a cylindrical structure, and the second case body 12 can be a case having a circular plate structure.

The smoke detecting unit 20 can be a heat-sensitive detecting unit, a smoke-sensitive detecting unit, or a heat-sensitive and smoke-sensitive compound detecting unit, but is not limited thereto. In this embodiment, the smoke detecting unit 20 can include a smoke collecting box 21 and a control module 22 electrically connected to the smoke collecting box 21.

The layering plate 30 is a plate that is substantially round-shaped, and the layering plate 30 is disposed in the case 10. The layering plate 30 defines an upper layer space SP1 and a lower layer space SP2 in the case 10. The layering plate 30 is located between the first case body 11 and the second case body 12. That is, a space between an upper plate surface of the layering plate 30 and the second case body 12 can be the upper layer space SP1, and a space between a lower plate surface of the layering plate 30 and the first case body 11 can be the lower layer space SP2. Therefore, the upper layer space SP1 and the lower layer space SP2 are divided in the case 10. The upper layer space SP1 is a smoke guiding space (i.e., a space for guiding smoke to flow inward), and the smoke collecting box 21 is accommodated in the upper layer space SP1 to facilitate smoke-containing air to flow to the smoke collecting box 21. The lower layer space SP2 is a module mounting space (i.e., a space for mounting modules), and the control module 22 is accommodated in the lower layer space SP2 to facilitate mounting of a sub-module 221 of the control module 22 that is detachable.

Furthermore, the control module 22 includes a main module 222, and the main module 222 can include a microprocessor, a memory, and other passive components. The sub-module 221 that is detachable is electrically connected to the main module 222, the sub-module 221 that is detachable can be electrically connected to the main module 222 through an electrical connector, and the sub-module 221 that is detachable can be a radio frequency communication module (RF communication module) for communication with external devices (such as a receiver). Since different RF communication modules generally do not match with different external devices, a matching RF communication module needs to be mounted in the smoke alarm. A structural design of the control module 22 being accommodated in the lower layer space SP2 that is specifically divided facilitates the mounting of different sub-modules, and a structural design of the smoke collecting box 21 being accommodated in the upper layer space SP1 that is specifically divided prevents the guiding of the smoke-containing air from being affected by different sub-modules 221.

In detail, for facilitating a guiding of the smoke, a plurality of guiding ribs 40 are located in the upper layer space SP1, and one of a plurality of guiding channels 41 is formed between any two adjacent ones of the plurality of guiding ribs 40 to facilitate the smoke-containing air to flow to the smoke collecting box 21 through the plurality of guiding channels 41. In this embodiment, the smoke collecting box 21 is substantially cylinder-shaped, and the plurality of guiding ribs 40 surround the smoke collecting box 21 and extend along radial directions of the layering plate 30. Each of the guiding ribs 40 extends outward and is slightly bent, and is disposed between the upper plate surface of the layering plate 30 and the second case body 12 of the case 10. It should be noted that, in this embodiment, the plurality of guiding ribs 40 are integrally connected with the upper plate surface of the layering plate 30, but is not limited thereto. For example, the plurality of guiding ribs 40 can be integrally connected with a bottom of the second case body 12 of the case 10.

Moreover, a width of each of the plurality of guiding channels 41 formed between any two adjacent ones of the plurality of guiding ribs 40 is gradually decreased along a direction toward a center of the smoke collecting box 21, and a width of each of the plurality of guiding channels 41 formed between any two adjacent ones of the plurality of guiding ribs 40 is gradually increased along a direction away from the center of the smoke collecting box 21, so as to facilitate guiding of the smoke.

Furthermore, the width of each of the plurality of guiding channels 41 formed between any two adjacent ones of the plurality of guiding ribs 40 is gradually increased along a direction away from the center of the smoke collecting box 21, so that certain unwanted creatures (e.g., a spider) may easily inhabit at this location. To prevent this, the plurality of guiding channels 41 of this embodiment are partially shielded by the case 10. In addition, a plurality of narrow and long slots 111 are formed at a periphery of the first case body 11 of the case 10 and are spaced apart from each other to surround the case, and the plurality of narrow and long slots 111 are respectively in fluid communication with a corresponding one of the guiding channels 41. Therefore, the smoke-containing air can enter the guiding channels 41 through the narrow and long slots 111, but creatures cannot inhabit the guiding channels 41 by entering through the narrow and long slots 111.

Accordingly, the smoke-containing air can enter the guiding channels 41 through the narrow and long slots 111, and be transported to the smoke collecting box 21 via the guiding channels 41. The smoke collecting box 21 can have light-emitters and light-receivers (not shown in the figures) therein, and particles of the smoke causes fraction in lights emitted by the light-emitters so that the light-receivers receive the lights, such that the main module 222 can determine whether or not a fire has occurred according to an amount of light receive by the light-receivers. When it is confirmed that the fire has occurred, the main module 222 communicates with external devices through the sub-module 221 to notify relevant personnel.

In addition, for facilitating the mounting and fixing of the sub-module 221, a plurality of mounting hooks 50 are disposed in the lower layer space SP2, and the sub-module 221 is located between the plurality of mounting hooks 50. Through the cooperation of the mounting hooks 50, the sub-module 221 can be mounted and fixed in the lower layer space SP2. It should be noted that, in this embodiment, the plurality of mounting hooks 50 are in one-piece connection with the lower plate surface of the layering plate 30, but is not limited thereto. For example, the plurality of mounting hooks 50 can be integrally connected with the first case body 11 of the case 10.

In this embodiment, the width of each of the plurality of guiding channels 41 formed between any two adjacent ones of the plurality of guiding ribs 40 is gradually increased along a direction away from the center of the smoke collecting box 21, such that a buzzer 60 that is ultra-thin and electrically connected to the control module 22 can be accommodated in one guiding channel 41 formed between two adjacent ones of the plurality of guiding ribs 40. Accordingly, a space can be utilized and the smoke-containing air entering the smoke collecting box 21 through the one guiding channel 41 is not interfered with.

Beneficial Effects of the Embodiment

In conclusion, in the smoke alarm having a layered structure provided by the present disclosure, the layering plate defines an upper layer space and a lower layer space in the case, the upper layer space is a smoke guiding space, and the smoke collecting box is accommodated in the upper layer space to facilitate smoke-containing air to flow to the smoke collecting box. Furthermore, the lower layer space is a module mounting space, and the control module is accommodated in the lower layer space to facilitate mounting of a sub-module of the control module that is detachable. Therefore, a structural design of the control module being accommodated in the lower layer space that is specifically divided facilitates the mounting of different sub-modules, and a structural design of the smoke collecting box being accommodated in the upper layer space that is specifically divided prevents the guiding of the smoke-containing air from being affected by different sub-modules.

Moreover, a peripheral of the case has a plurality of narrow and long slots that are arranged by a distance to surround the case, and the plurality of narrow and long slots are respectively in fluid communication with a corresponding one of the guiding channels, so that the smoke-containing air can enter the guiding channels through the narrow and long slots and creatures cannot inhabit the guiding channels by entering through the narrow and long slots.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A smoke alarm having a layered structure, comprising:
a case;
a smoke detecting unit disposed in the case, wherein the smoke detecting unit includes a smoke collecting box and a control module electrically connected to the smoke collecting box; and
a layering plate disposed in the case, wherein the layering plate defines an upper layer space and a lower layer space in the case, the upper layer space is a smoke guiding space, and the smoke collecting box is accommodated in the upper layer space to facilitate smoke-containing air to flow to the smoke collecting box; wherein the lower layer space is a module mounting space, and the control module is accommodated in the lower layer space to enable mounting of a sub-module of the control module that is detachable;
wherein a plurality of narrow and long slots are formed at a periphery of the case and are spaced apart from each other to surround the case;
wherein a length direction of each of the plurality of narrow and long slots corresponds to a direction from the lower layer space to the upper layer space;
wherein each of the plurality of narrow and long slots is configured to be formed in spatial communication with both the lower layer space and the upper layer space.

2. The smoke alarm according to claim 1, wherein the case includes a first case body and a second case body that are assembled to each other, and the layering plate is located between the first case body and the second case body.

3. The smoke alarm according to claim 1, wherein the control module includes a main module that is electrically connected to the sub-module.

4. The smoke alarm according to claim 3, wherein the sub-module is a radio frequency communication module for communicating with external devices.

5. The smoke alarm according to claim 1, wherein a plurality of guiding ribs are located in the upper layer space, and one of a plurality of guiding channels is formed between any two adjacent ones of the plurality of guiding ribs to facilitate the smoke-containing air to flow to the smoke collecting box through the plurality of guiding channels.

6. The smoke alarm according to claim 5, wherein the plurality of guiding ribs are integrally connected with an upper plate surface of the layering plate.

7. The smoke alarm according to claim 5, wherein the plurality of guiding ribs surround the smoke collecting box and extend along radial directions of the layering plate, and a width of each of the plurality of guiding channels is gradually increased along a direction away from a center of the smoke collecting box.

8. The smoke alarm according to claim 1, wherein a plurality of mounting hooks are disposed in the lower layer space, and the sub-module is located between the plurality of mounting hooks.

9. The smoke alarm according to claim 8, wherein the plurality of mounting hooks are integrally connected with a lower plate surface of the layering plate.

* * * * *